US006571062B2

(12) United States Patent
Ogasawara

(10) Patent No.: US 6,571,062 B2
(45) Date of Patent: May 27, 2003

(54) ELECTRIC FLASH DEVICE PREDICTING QUANTITY OF OVERRUN LIGHT ACCORDING TO TARGET QUANTITY OF EMISSION

(75) Inventor: Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/770,500

(22) Filed: Jan. 29, 2001

(65) Prior Publication Data

US 2001/0014216 A1 Aug. 16, 2001

(30) Foreign Application Priority Data

Feb. 9, 2000 (JP) ....................................... 2000-032234

(51) Int. Cl.[7] ................................................ G03B 15/03
(52) U.S. Cl. ....................................... 396/159; 396/164
(58) Field of Search ................................ 396/155, 159, 396/161, 164; 356/402; 315/241 P

(56) References Cited

U.S. PATENT DOCUMENTS 5,004,349 A * 4/1991 Sato et al. .................. 356/402
5,283,610 A * 2/1994 Sasaki ........................ 396/171

* cited by examiner

*Primary Examiner*—Russell Adams
*Assistant Examiner*—Arthur A Smith
(74) *Attorney, Agent, or Firm*—Oliff & Berridge PLC

(57) ABSTRACT

The present invention relates to an electronic flash device capable of dimming control, particularly with the objective of enhancing the dimming precision in weak light emissions. The electronic flash device of the present invention thus predicts the quantity of overrun light after stopping of the emission based on the target quantity of emission, and performs correction to advance emission stop timing in accordance with the quantity of overrun light. Here, the rate between the target quantity of emission and the quantity of full emission by the emission means (the rate of emission) is preferably obtained so that the quantity of overrun light after stopping of the emission is predicted based on the rate of emission. In split emission, the emission stop timing is preferably corrected on each chopper emission.

10 Claims, 10 Drawing Sheets

EXAMPLE OF PREDICTION TABLE

| RATE OF EMISSION [%] (TARGET QUANTITY OF EMISSION/QUANTITY OF FULL EMISSION) | RATE OF OVERRUN [%] (QUANTITY OF OVERRUN LIGHT/QUANTITY OF FULL EMISSION) |
|---|---|
| 100.00 | 0.000 |
| 85.00 | 0.277 |
| 77.00 | 0.304 |
| 70.00 | 0.332 |
| 65.00 | 0.387 |
| 56.00 | 0.442 |
| 42.91 | 0.512 |
| 29.00 | 0.650 |
| 22.00 | 0.760 |
| 15.00 | 0.802 |
| 11.00 | 0.788 |
| 7.70 | 0.705 |
| 6.00 | 0.677 |
| 4.06 | 0.594 |
| 3.20 | 0.567 |
| 2.20 | 0.498 |
| 1.70 | 0.484 |
| 1.20 | 0.401 |
| 0.94 | 0.346 |
| 0.66 | 0.277 |
| 0.50 | 0.235 |

Fig. 3

ELECTRIC FLASH DEVICE PREDICTING QUANTITY OF OVERRUN LIGHT ACCORDING TO TARGET QUANTITY OF EMISSION

CROSS REFERENCE TO RELATED APPLICATION

The disclosure of the following priority application is herein incorporated by reference: Japanese Patent Application No. 2000-032234, filed Feb. 9, 2000.

BACKGROUND OF THE INVENTION

1. Field of the Invention

The invention relates to an electronic flash device capable of performing dimming control.

2. Description of the Related Art

FIG. 8 is a diagram showing a conventional example of an electronic flash device.

Hereinafter, an overview will be given of the operation of the conventional example with reference to FIG. 8. Initially, a photodiode PD produces electron-hole pairs according to the intensity of emission of the electronic flash device. These electron-hole pairs are separated across the depletion region inside the photodiode PD, and then efficiently led out through an imaginary short between the input terminals of an operational amplifier OP1 to make a photocurrent Ir. This photocurrent Ir flows through a diode D before getting absorbed into the output terminal of the operational amplifier OP1. Here, the output terminal of the operational amplifier OP1 carries the bias voltage V1 dropped by a forward voltage of the diode D. This output voltage of the operational amplifier OP1 is applied to the emitter of a transistor Tr2. Meanwhile, a gain control voltage V2 is applied to the base of the transistor Tr2 through a voltage follower circuit consisting of an operational amplifier OP2.

As a result, the photocurrent which has been logarithmically compressed by the forward voltage characteristic of the diode D is in turn logarithmically decompressed by the (Vbe-Ic) characteristic of the transistor Tr2, whereby a photo-detection current Ip corresponding to the light intensity is restored. Here, increasing/decreasing the gain control voltage V2 allows the gain of the photo-detection current Ip over the light intensity to be adjusted to film speed or the like.

The photo-detection current Ip obtained thus is passed through the loads, or a capacitor C and a resistor Rd, so that it is converted into a photo-detection voltage Vp. This photo-detection voltage Vp is compared with a threshold voltage Vth in a comparator CMP. The comparator CMP, when this photo-detection voltage exceeds the threshold Vth, outputs an emission stop signal STOP to an emission stop circuit (not shown) in the electronic flash device. Incidentally, the transistor Tr1 is a switching circuit for resetting the storage charge in the capacitor C, and is kept short until the point of starting light emission.

In such an operation, modifications to the threshold voltage Vth allow control over the quantity of emission (the integrated quantity of light up to an emission stop) of the electronic flash device.

FIGS. 9(A)–(C) are emission waveforms in the electronic flash device described above. Immediately after the output of the emission stop signal STOP, the emission waveforms keep their light emission with attenuation until complete light-out. The quantity of the remaining light (hereinafter, referred to as "the quantity of overrun light") contributes a control error to dimming control.

Conventionally, such a control error has been mended by differential correction using the resistor Rd. Across this resistor Rd occurs in real time a voltage drop corresponding to the light intensity. This voltage drop is added to the storage capacitance in the capacitor c (an integrated value of light intensities, corresponding to the quantity of emission), thereby elevating the photo-detection voltage Vp. Thus the higher the instantaneous light intensities are, the greater the photo-detection voltage Vp appears to be, which leads to earlier output of the emission stop signal STOP. In general, higher emission intensities at the point of emission stop would produce greater quantities of overrun light. Therefore, such differential correction could improve the control error in the dimming control up to a certain degree.

By the way, in weak light emissions, the quantity of overrun light forms a great proportion to the target quantity of emission as shown in FIG. 9(B), with a possible control error of the order of 30%.

Nevertheless, in the conventional differential correction, the resistor Rd could produce only an extremely small voltage drop in weak light emissions, thereby promising little correction effects.

SUMMARY OF THE INVENTION

In view of the foregoing problem, an object of the present invention is to provide an electronic flash device which can improve the dimming precision even in weak light emissions.

To achieve this object, the present invention is configured as stated below.

An electronic flash device according to the present invention comprises: an emission unit for performing flash emission; an emission monitoring unit for monitoring the quantity of emission by the emission unit; and an emission control unit for stopping the emission by the emission unit based on a comparison between the quantity of emission monitored by the emission monitoring unit and a predetermined target quantity of emission. Here, the emission control unit predicts the quantity of overrun light after stopping of the emission based on the target quantity of emission and corrects emission stop timing in accordance with the quantity of overrun light.

In the configuration described above, the emission stop timing is corrected based on the quantity of overrun light predicted from the target quantity of emission. Therefore, in contrast to the conventional differential correction, it becomes possible to reliably make a correction to cover the quantity of light overrun, independent of the magnitudes of instantaneous light intensities. This allows a sure improvement to the precision of the dimming control even in weak light emissions.

Here, it is particularly preferable for the emission monitoring unit to receive light from the emission unit directly. In this case, the emission monitoring unit is free from receiving external effects, such as to-subject distances and subject reflectance. Thus, the conditions for the light quantity monitoring remain constant almost each time. This allows predictions to be made without consideration of these external effects, thereby ensuring higher accuracy for the predictions on the quantity of overrun light. Moreover, since the conditions for the light quantity monitoring remain constant almost each time, it naturally follows that corrections when the emission stop timing is advanced improves in accuracy also. These synergistic effects bring about further improvements to the precision of the dimming control.

The emission monitoring unit in the present invention preferably includes: a photoelectric transducer for receiving light from the emission unit to generate an output according to the light intensity; a storage unit for storing the output generated by the photoelectric transducer; a discharge control unit for sequentially discharging a predetermined amount of storage out of the storage unit so that the storage in the storage unit is maintained generally constant; and a counter for counting the number of times the discharge control unit discharges the predetermined amount of storage and for outputting the count result as the result of monitoring the quantity of emission.

The predictions on the quantity of overrun light according to the present invention is generally suitably effected through digital processing, including prediction computing and making table reference. To execute these kinds of digital processing as part of the dimming control in the electronic flash device, it is preferable for the dimming control itself to be digitally controlled.

Nevertheless, digitally converting such high-speed, wide-dynamic-range phenomena as flash emission in real time inevitably requires an A/D conversion circuit with appropriate high speed and performance. On this account, simply realizing a digital dimming control would result in a negative effect that the electronic flash device complicates in configuration and increases in cost.

Thus, in the above-described configuration, the process of an analog feedback control, of maintaining the amount of storage in the storage unit generally constant is utilized to easily convert the quantity of emission into the number of discharges (digital amount). As a result, a dimming control of a digital type is realized in a simple configuration without having any additional high-speed, high-performance A/D conversion circuit.

In particular, such a configuration makes it possible to make a precise, sure correction to the emission stop timing through simple digital processing (e.g. digital processing of offsetting the target quantity of emission or the number of discharges to cover the predicted quantity of overrun light).

The emission control unit in the present invention preferably predicts the quantity of overrun light after stopping of the emission based on the rate between the target quantity of emission and the quantity of full emission by the emission unit (the rate of emission), and corrects emission stop timing in accordance with the quantity of overrun light.

In general, the quantity of full emission varies due to such factors as "changes in boosting voltage" and "deterioration of the flash tube due to aging." Naturally, this variation in the quantity of full emission also changes the quantity of overrun light so the predicting accuracy of the quantity of overrun light mentioned above inevitably deteriorates.

Therefore, in the above-described configuration, the quantity of overrun light is predicted based on the rate between the target quantity of emission and the quantity of full emission (the rate of emission). Such predictions based on the rate of emission normalized with the quantity of full emission ease the effect from the full emission varying in quantity, thereby preventing deterioration in predicting accuracy.

The quantity of full emission is preferably estimated, for example, from the value of the boosting voltage before emission, from the quantity of the previous emission, records of past emissions, or the quantity of light monitored in preparatory emissions, and so on.

The emission control unit in the present invention preferably corrects the emission stop timing upon each emission when repeating the emitting/stopping by the emission unit a plurality of times to perform split emission.

Most of the individual emissions (chopper emissions) in the split emission are weak light emissions. As described above, the present invention offers higher correction effects in weak light emissions as compared with the conventional example. Therefore, performing the light quantity correction of the present invention in each chopper emission allows a significant improvement to the dimming precision in split emission.

Particularly, the improvement to the dimming precision for each chopper emission allows precise control over the mean intensity of light when taking split light in terms of flat light. Accordingly, it becomes possible to control light exposure with precision in the cases where the exposure period is controlled separately (e.g. where a camera shutter is slit-moved for exposure).

The emission control unit in the present invention preferably predicts the total sum of the quantities of overrun light for the entire split emission when repeating the emitting/stopping by the emission unit a plurality of times for split emission, and corrects the number of emissions in accordance with the total sum of the quantities of overrun light.

In the configuration described above, the light quantity correction is effected by correcting the number of stops in the split emission. Therefore, it becomes possible to control light exposure with precision in the cases where the exposure period is not controlled separately (e.g. where the flash is emitted with the shutter fully open).

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is an example of a prediction table which is stored into an internal memory area of the microprocessor 13;

DETAILED DESCRIPTION OF THE PREFERRED EMBODIMENTS

Hereinafter, the embodiments of the present invention will be described with reference to the drawings.

<First Embodiment>

Figure 1:
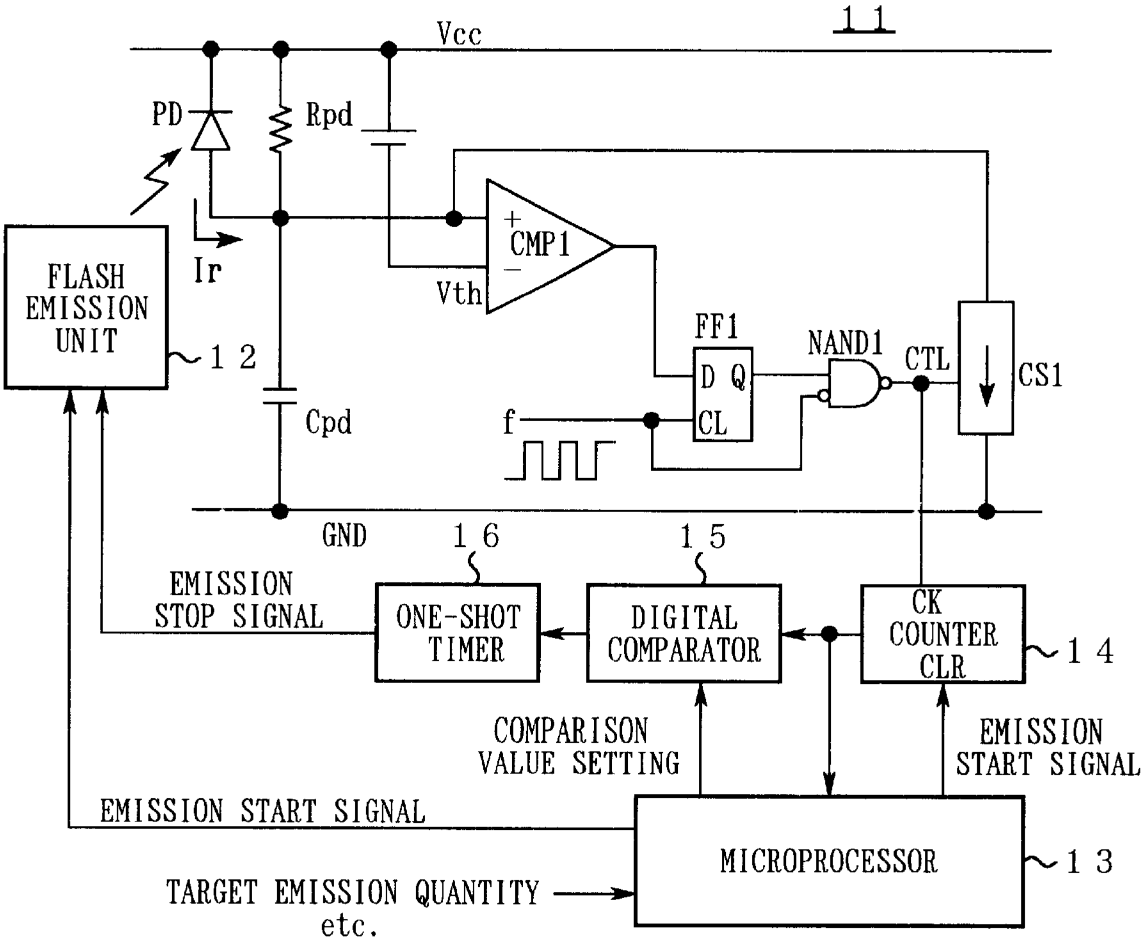
FIG. 1 is a diagram showing an electronic flash device 11 according to a first embodiment.

FIG. 1 is a diagram showing an electronic flash device 11 according to a first embodiment of the present invention. Hereinafter, the configuration of the electronic flash device 11 will be described with reference to FIG. 1.

The electronic flash device 11 has a flash emission unit 12 for emitting flash. This flash emission unit 12 is supplied with an emission start signal from a microprocessor 13. A photodiode PD is arranged in a position where it directly receives the light from the flash emission unit 12 through the medium of optical fibers or the like. This photodiode PD is connected at its cathode to a power supply line Vcc. Meanwhile, the anode of the photodiode PD is connected to either one terminal of a latch-preventive resistor Rpd, either one terminal of a capacitor Cpd, the positive input terminal of a comparator CMP1, and a constant current source CS1. The other terminal of the resistor Rpd is connected to the power supply line Vcc. The other terminal of the capacitor Cpd is connected to a ground GND.

The negative input terminal of this comparator CMP1 is supplied with a threshold voltage Vth through a constant voltage circuit. In addition, the output of the comparator CMP1 is applied to the input terminal D of a D-type flip-flop FF1.

The output Q of this flip-flop FF1 is applied to either one input terminal of a NAND circuit NAND1. Besides, the clock terminal of the flip-flop FF1 is supplied with a sample clock f. Moreover, the other input terminal of the NAND circuit NAND1 is supplied with the inverted signal of the sample clock f.

The output CTL of this NAND circuit NAND1 is applied to a control input of the constant current source CS1 and the clock terminal of a counter 14. The counter 14 also has a reset terminal CLR which is supplied with the emission start signal from the microprocessor 13.

The count of this counter 14 is given to either one comparison input of a digital comparator 15. The other comparison input of this digital comparator 15 is set with a comparison value from the microprocessor 13.

The comparison output of the digital comparator 15 is shaped into a one-shot emission stop signal by the one-shot timer 16, and given to the flash emission unit 12.

Incidentally, various pieces of information (such as an X-contact signal and the setting information on the target quantity of emission) are input to the microprocessor 13 through not-shown control buttons, input terminals, hot shoe, and so on.

[Description of First Embodiment Operation]

Figure 2:
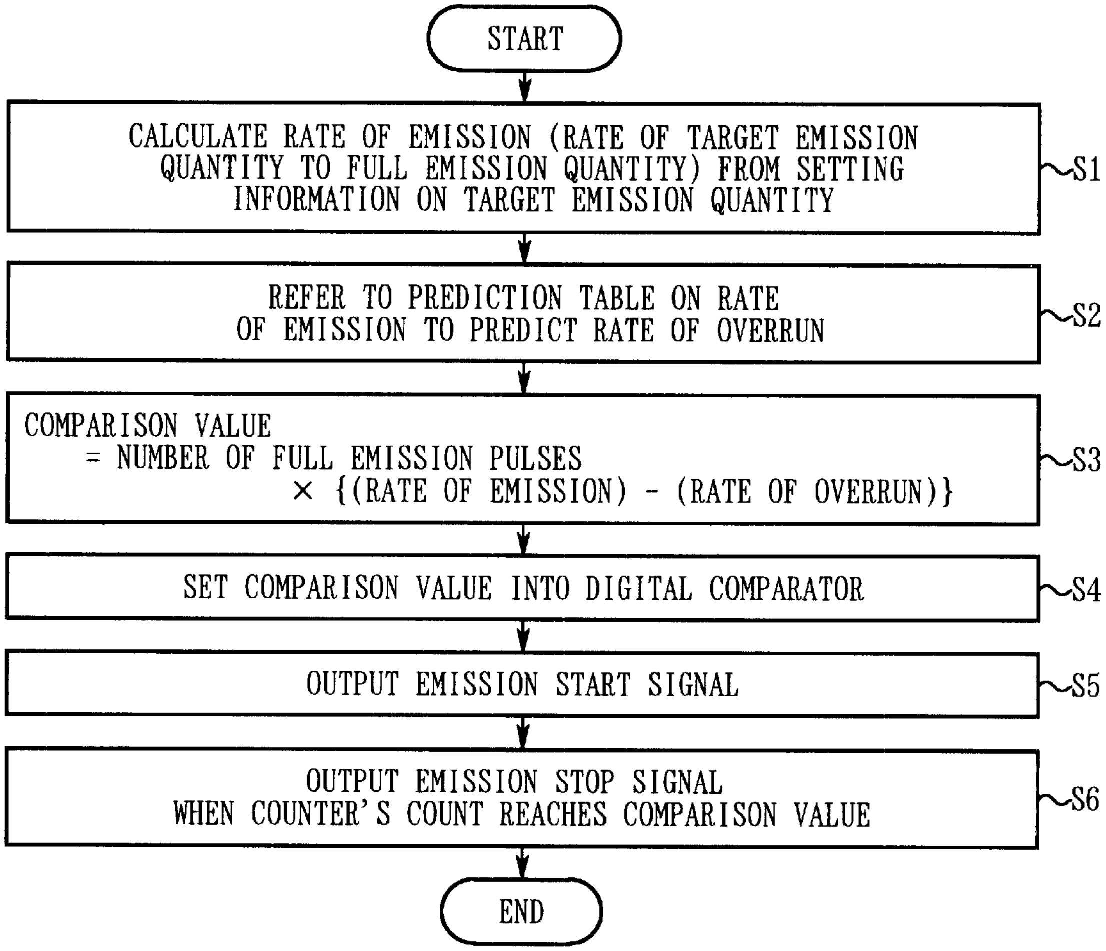
FIG. 2 is a flowchart explaining the operation of a microprocessor 13.

FIG. 2 is a flowchart explaining the operation of the microprocessor 13.

FIG. 3 is an example of a prediction table which is stored into an internal memory area of the microprocessor 13. This prediction table contains the results of emission experiments with the flash emission unit 12.

Figure 4:
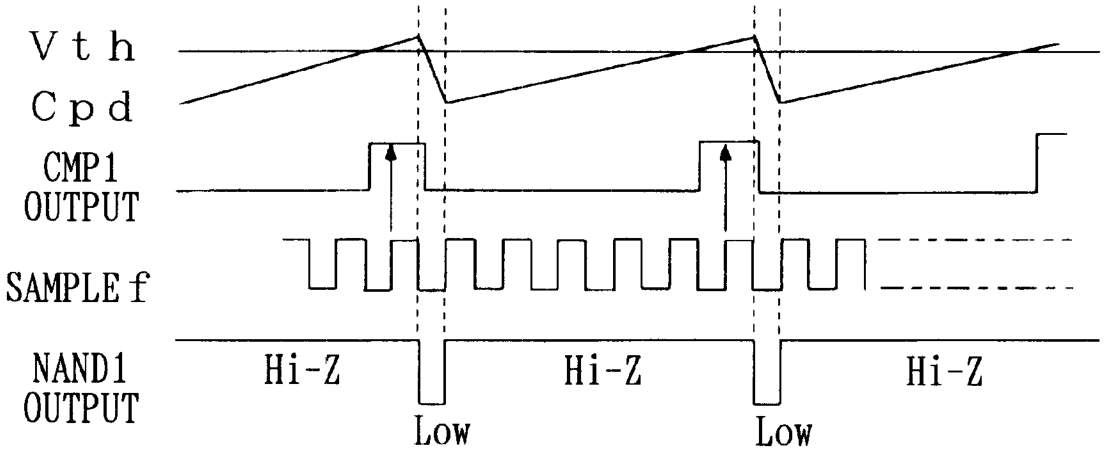
FIG. 4 is a timing chart for explaining the circuit operation of the flash emission unit 11.

FIG. 4 is a timing chart for explaining the circuit operation of the flash emission unit 11.

Hereinafter, the operation of the first embodiment will be described along the step numbers shown in FIG. 2.

Step S1: Initially, the user of the electronic flash device 11 manually sets the electronic flash device 11 with the target quantity of emission as a guide number value. The microprocessor 13 converts the guide number value set thus into the number of pulses in the counter 14. The microprocessor 13 determines the rate between the target quantity of emission converted and the quantity of full emission (the rate of emission). Incidentally, in this step, the user may directly set the rate of emission by hand.

Step S2: Subsequently, the microprocessor 13 refers to the prediction table shown in FIG. 3. This prediction table has records of relationships between the rate of emission and the rate of overrun, determined from past experimental data. Based on the rate of emission determined at step S1, the microprocessor 13 interpolates the relationships to predict the rate of overrun.

Step S3: The microprocessor 13 calculates $$\text{Comparison value} = \text{Number of full emission pulses} \times \{(\text{Rate of emission}) - (\text{Rate of overrun})\}, \quad (1)$$

thereby determining a comparison value estimated smaller by the quantity of overrun light predicted.

Step S4: Next, the microprocessor 13 sets this comparison value into the digital comparator 15.

Step S5: Then, the microprocessor 13 sends out the emission start signal to the flash emission unit 12 and the counter 14 in time with the X contact or the like.

Step S6: The counter 14 initializes its count in response to this emission start signal. Meanwhile, the flash emission unit 12 starts flash emission in response to this emission start signal. Here, part of the light from the flash emission unit 12 is received by the photodiode PD. The photodiode PD produces electron-hole pairs according to the intensity of the light received. The electron-hole pairs are led out under a reverse bias voltage (≈Vcc-Vth) of the photodiode PD, so as to make a photocurrent Ir. This photocurrent Ir is stored into the capacitor Cpd, thereby elevating the potential across the capacitor Cpd.

When this potential across the capacitor Cpd exceeds the potential Vth on the negative input of the comparator CMP1, the comparator CMP1 turns its output to high level as shown in FIG. 4.

This comparator output is held by the flip-flop FF1 in synchronization with the rise of the sample clock f. While the output Q of the flip-flop FF1 is at high level, the output CTL of the NAND circuit NAND1 presents the sample clock f as it is. This output CTL causes intermittent operations of the constant current source CS1 so that a certain amount of electric charge is discharged from the capacitor Cpd intermittently.

Such an intermittent electric discharge is repeated to maintain the potential across the capacitor Cpd in the vicinity of Vth as shown in FIG. 4. Meanwhile, the counter 14 successively counts the number of times the certain amount of charge is discharged. The count of the counter 14 corresponds to the quantity of emission by the flash emission unit 12.

The digital comparator 15 outputs the emission stop signal at the instant when the count reaches the comparison value that is set at step S4. This emission stop signal is shaped by the one-shot timer 16 before supplied to the flash emission unit 12.

The flash emission unit 12 interrupts the supply current to the flash tube and the like in time with the emission stop signal. Then, the flash emission unit 12 makes nearly as much emission as the quantity of overrun light predicted at step S2 until it fully stops emission. Under the operations mentioned above, the total quantity of emission by the flash emission unit 12 is controlled to the target quantity of emission with precision.

Now, the above-mentioned operations are described with concrete numerals. Assume that the quantity of full emission is equivalent to 10000 pulses and the target quantity of emission is as small as 100 pulses or so. Here, the rate of emission is 1%. The microprocessor 13 interpolates the prediction table shown in FIG. 3 to predict that the rate of overrun corresponding to the rate of emission of 1% will be 0.359%. This means that 100 pulses of emission by the flash emission unit 12 will be followed by an overrun as much as 36 pulses. Thus the microprocessor 13 subtracts 36 pulses from the target quantity of emission of 100 pulses to obtain a comparison value of 64 pulses for emission stop. The digital comparator 15 outputs the emission stop signal at the instant when the quantity of emission is counted up to the comparison value of 64 pulses. After the output of this emission stop signal, the flash emission unit 12 makes emission approximately as much as the quantity of overrun light of 36 pulses. As a result, the total quantity of emission by the flash emission unit 12 is controlled to approximately 100 pulses.

[Effects of First Embodiment]

As has been described above, according to the first embodiment, the quantity of overrun light by the flash emission unit 12 is predicted in accordance with the target quantity of emission, and the correction to advance the emission stop timing is made on the basis of the prediction result. This makes it possible to obtain a precise, reliable correction effect even in weak light emissions with the rate of emission on the order of 1% as described above.

Besides, according to the first embodiment, the quantity of emission by the flash emission unit 12 is converted into the number of discharges, a digital amount. As a result, the overrun correction can be made through simple digital processing without adding any high-performance A/D conversion circuit.

In particular, according to the first embodiment, the rate of emission is determined with the target quantity of emission normalized by the quantity of full emission, and the quantity of overrun light is predicted from this rate of emission. As a result, such effects as changes of boosting voltage can be eliminated to allow precise prediction of the quantity of overrun light.

Now, description will be given of another embodiment.

<Second Embodiment>

Figure 5:
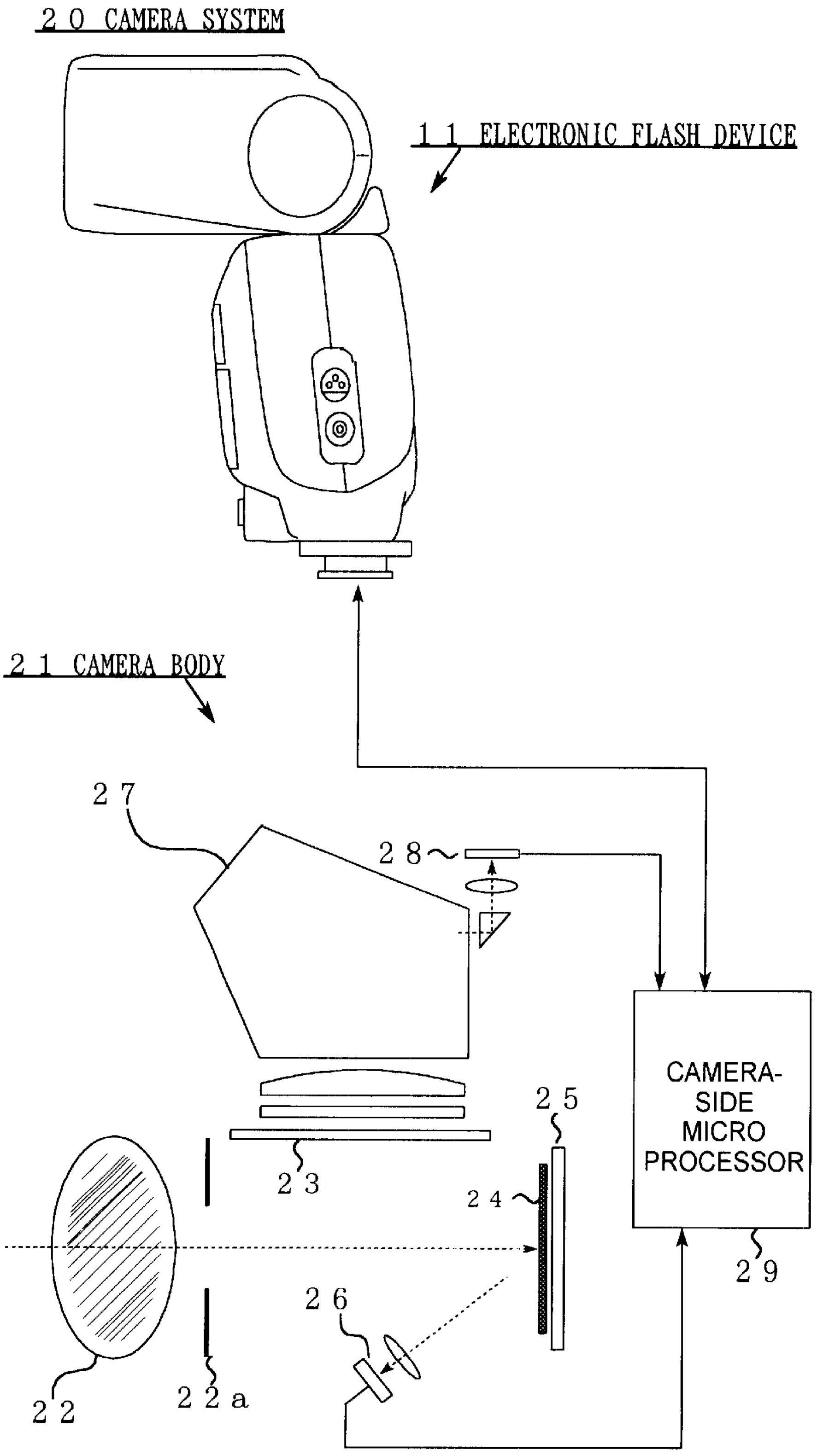
FIG. 5 is a diagram showing a camera system 20 according to a second embodiment.

FIG. 5 is a diagram showing a camera system 20 according to the second embodiment. Since the internal configuration of the electronic flash device 11 shown in FIG. 5 is the same as that of the first embodiment (FIG. 1), description thereof will be omitted here.

Hereinafter, description will be given of the configuration of the camera system 20 with reference to FIG. 5.

The camera system 20 is composed of a camera body 21 and the electronic flash device 11. A shooting lens 22 is mounted on the camera body 21. An iris 22*a,* a mirror 23, and a shutter 24 are arranged in the image space of the shooting lens 22. Behind the shutter 24 is arranged a film or an imaging plane 25 of an image pickup device. A dimming metering unit 26 is arranged in a position where it receives the light reflected from the shutter 24 or the imaging plane 25. This dimmer metering unit 26 comprises a plurality of metering areas in combination so as to multi-meter the light quantity distribution of the field.

In addition, the camera system 20 comprises a finder optical system 27. This finder optical system 27 is also provided with a metering unit 28 for metering fixed light.

The results of metering by these metering units 26 and 28 are input to a camera-side microprocessor 29. The camera-side microprocessor 29 outputs dimming control information, X-contact timing information, and the like to the microprocessor 13 in the electronic flash device 11.

[Description of Second Embodiment Operation]

Figure 6A:
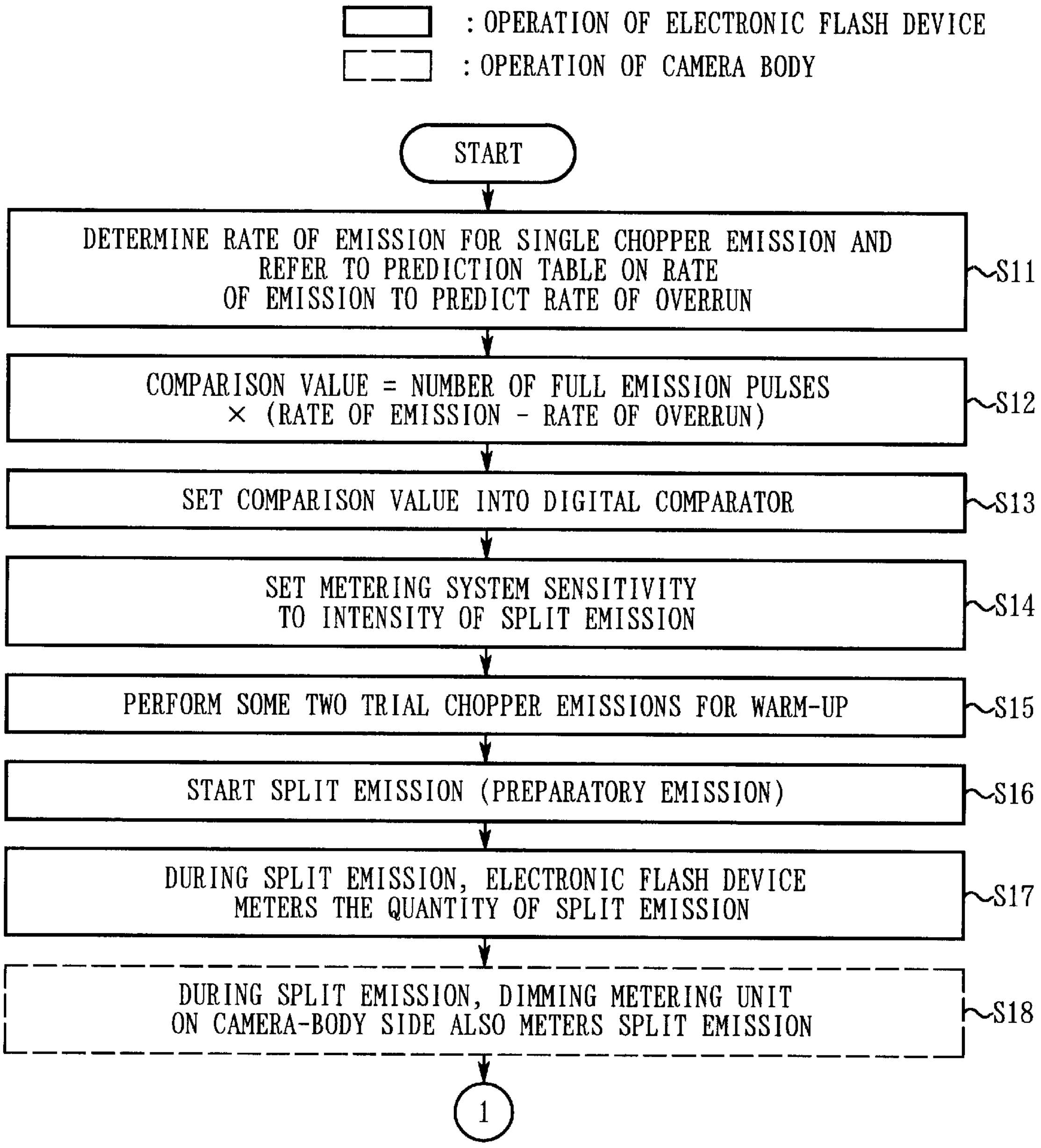
FIGS. 6A and 6B are a flowchart explaining the operation of the second embodiment.
Figure 6B:
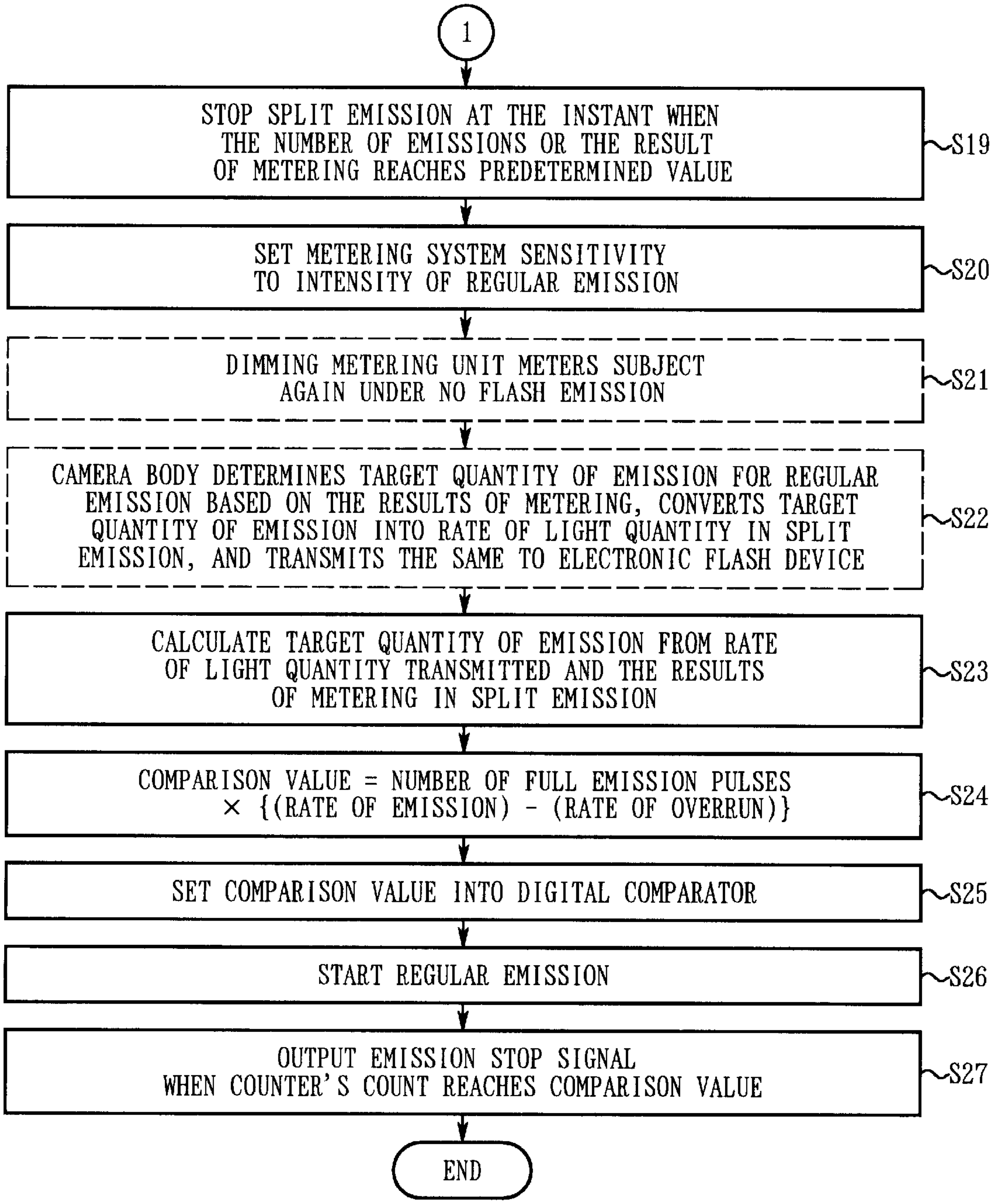

FIGS. 6A and 6B are a flowchart explaining the operation of the second embodiment.

Figure 7:
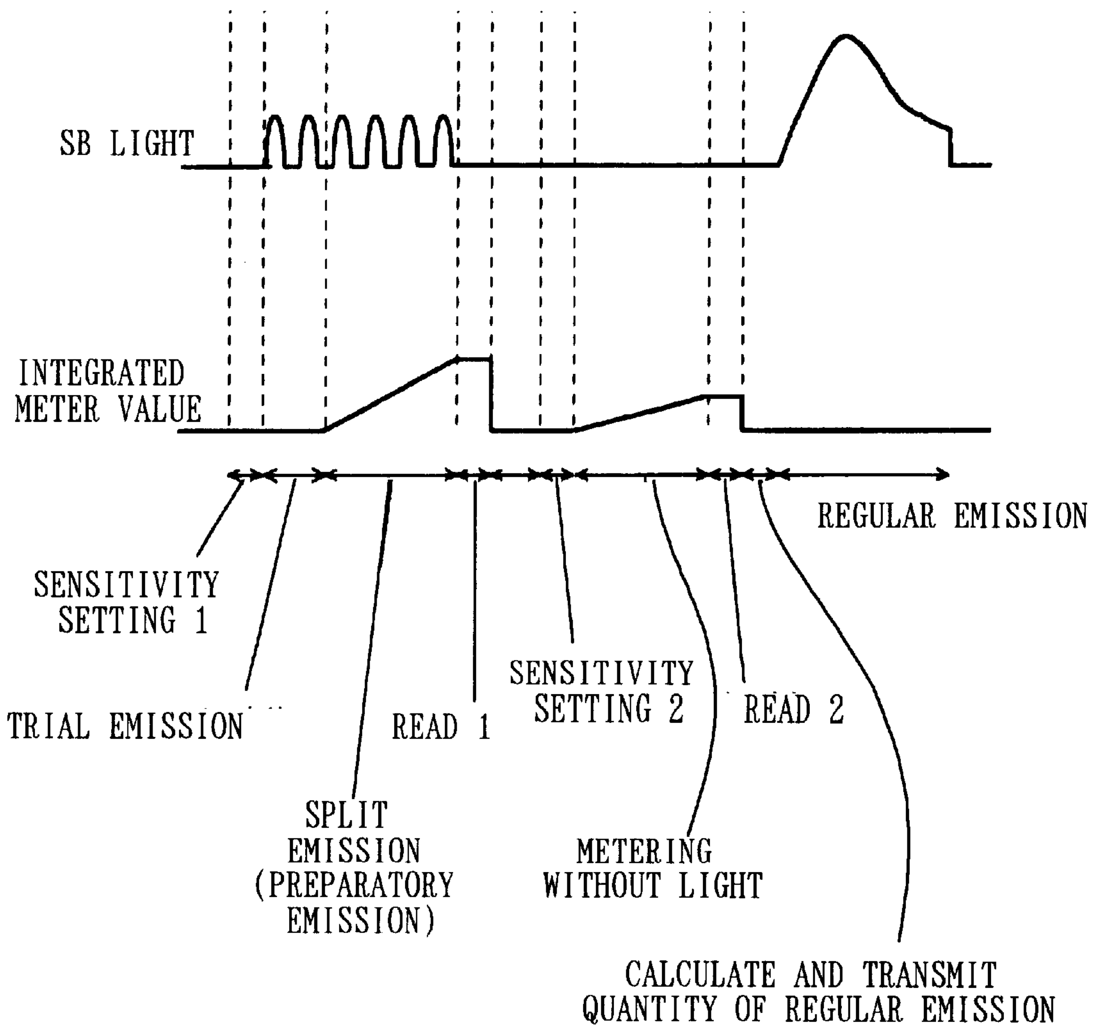
FIG. 7 is a timing chart explaining the operation of the second embodiment.
Figure 8:
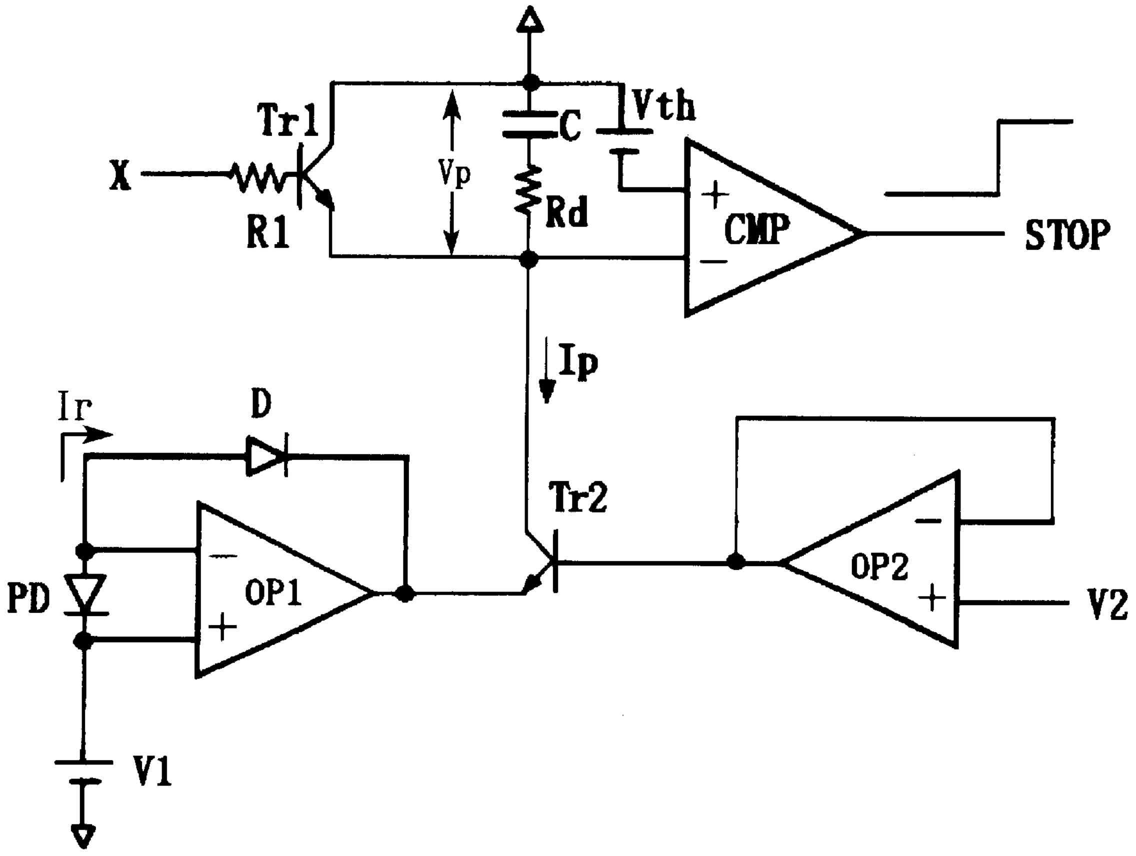
FIG. 8 is a diagram showing a conventional electronic flash device.
Figure 9:
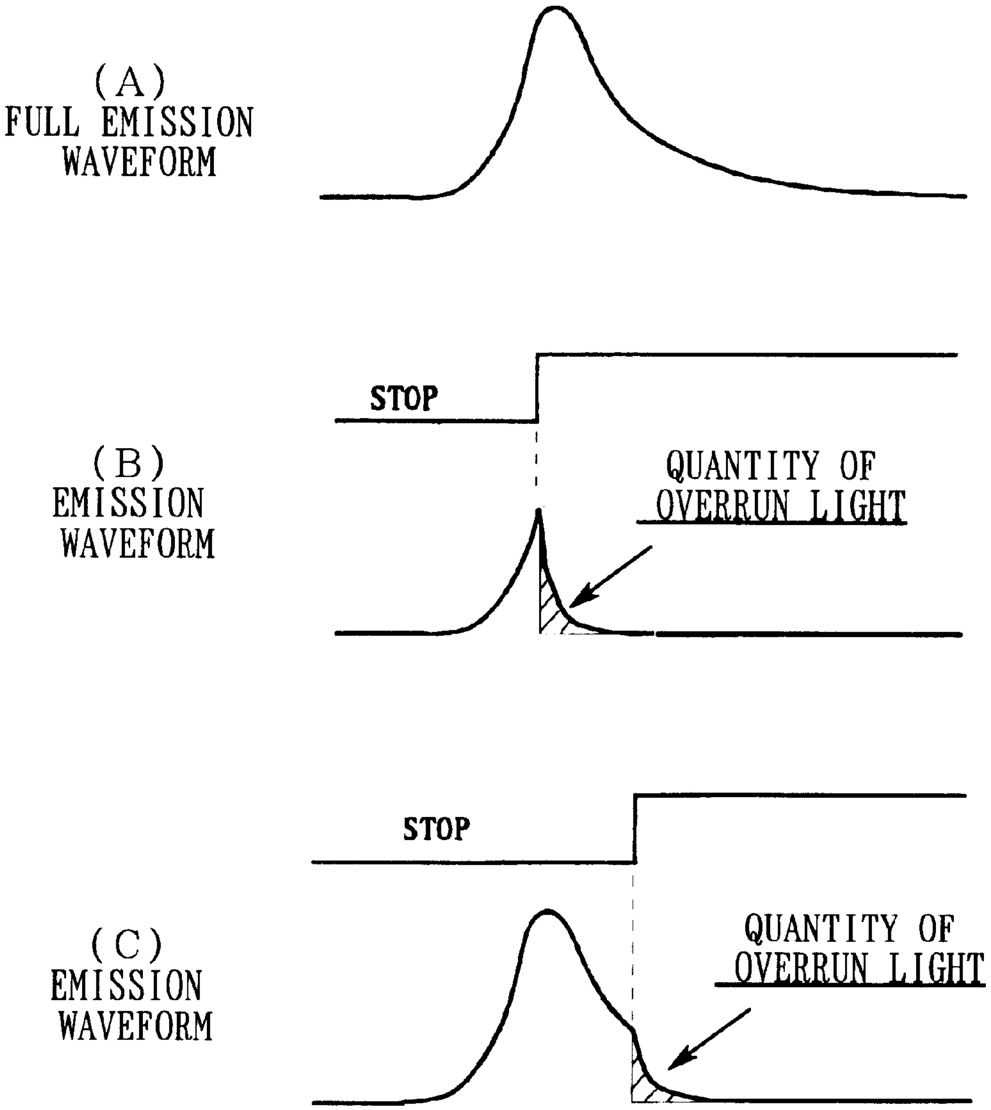
FIG. 9 is a diagram showing flash emission waveforms.

FIG. 7 is a timing chart explaining the operation of the second embodiment.

Hereinafter, the operation of the second embodiment will be described along the step numbers shown in FIGS. 6A and 6B.

Initially, on the camera body 21 side, photo shooting is started with narrowing the iris 22*a* to a predetermined value and flipping the mirror 23 up. In this state, the electronic flash device 11 performs split emission (emission consisting of a plurality of chopper emissions) in the following steps.

Step S11: The microprocessor 13 determines the rate of emission for a single chopper emission. The microprocessor 13 makes reference to a prediction table based on the rate of emission, thereby determining the rate of overrun for a single chopper emission.

Step S12: Next, the microprocessor 13 calculates $$\text{Comparison value} = \text{Number of full emission pulses} \times \{(\text{Rate of emission}) - (\text{Rate of overrun})\} \quad (1)$$

to obtain a comparison value for the chopper emission.

Step S13: The microprocessor 13 sets the digital comparator 15 at this comparison value for the chopper emission. Due to this comparison value setting, the emission stop timing is corrected on each chopper emission so that the quantities of light of the chopper emissions are controlled with precision.

Step S14: The microprocessor 13 modifies the sensitivity settings on the metering system (including the current of the constant current source CS1, the frequency of the sample clock f, and the hysteresis width of the comparator CMP1) so that weak light can be detected with high sensitivity.

Step S15: The microprocessor 13 performs some two trial chopper emissions to warm up the metering circuits and the flash emission unit 12.

Step S16: After the trial emissions, the microprocessor 13 periodically outputs the emission start signal to start split emission.

Step S17: The microprocessor 13 meters the quantity of light of the split emission. The metering here can be effected, for example, by the microprocessor 13 reading the count of the counter 14 immediately before each output of the emission start signal and adding the count in succession. (Here, an additional circuit for monitoring the quantity of light may be provided aside from the control system for chopper emissions.)

Step S18: During the split emission period, the dimming metering unit 26 on the camera-body-21 side also multi-meters the light reflected from the curtain of the shutter 24.

Step S19: The microprocessor 13 terminates the split emission at the instant when the result of the metering or the number of emissions reaches a predetermined value.

Step S20: The microprocessor 13 modifies the sensitivity settings on the metering system (such as the current of the constant current source CS1, the frequency of the sample clock f, and the hysteresis width of the comparator CMP1) so that regular emission can be detected with a preferable dynamic range.

Step S21: The dimming metering unit 26 on the camera-body-21 side multi-meters the light reflected from the curtain of the shutter 24 under no flash emission.

Step S22: The camera body 21 calculates an appropriate target quantity of emission of the electronic flash device 11 based on the results of the multi-metering with the split emission and with no emission. This target quantity of emission is converted into the rate to the quantity of light metered on the camera-body-21 side under the split emission. Then, the rate is transmitted to the microprocessor 13 on the electronic-flash-device-11 side.

Step S23: The microprocessor 13 multiplies together the rate of light quantity transmitted and the quantity of light metered on the electronic-flash-device-11 side under the split emission, thereby determining the target quantity of emission.

Step S24: The microprocessor 13 divides the target quantity of emission determined at step S23 by the present quantity of full emission to determine the rate of emission. The microprocessor 13 makes reference to the prediction table based on the rate of emission, thereby obtaining the rate of overrun. Based on this rate of overrun, the microprocessor calculates Comparison value=Number of full emission pulses×{(Rate of emission)−(Rate of overrun)}×sensitivity correction value, thereby obtaining a comparison value for regular emission.

Step S25: The microprocessor 13 sets the digital comparator 15 at this comparison value for regular emission.

Step S26: The microprocessor 13 waits for an emission request from the camera-body-21 side (output upon the full release of the shutter 24, for example) before it outputs the emission start signal.

Step S27: Under the regular emission of the flash emission unit 12, the counter 14 increments its count. The digital comparator 15 outputs the emission stop signal at the instant when the count of the counter 14 reaches the comparison value set at step S25. Thus the flash emission unit 12 interrupts the current supply to its flash tube, with as much emission as the quantity of overrun light still to come. Then, the flash tube makes emission that covers the quantity of overrun light predicted at step S24 before light-out.

Through the operations mentioned above, a series of control sequences including both the preparatory emission (split emission) and the regular emission are completed.

[Effects of Second Embodiment]

The above-described operations provide the same effects as those obtained from the first embodiment.

Moreover, the second embodiment is characterized in that the emission stop timing is corrected on each chopper emission. Since each individual chopper emission produces extremely weak light, it is impossible to attain an adequate dimming precision through differential correction such as that of the conventional example. On the other hand, the correction operation in the present invention allows precise control over the quantity of each chopper emission. Accordingly, it becomes possible to provide precise control to the mean intensity of light for situations where the split emission is regarded as flat light emission.

<Supplemental Remarks on Embodiments>

While the above-described embodiments use the digital metering type circuitry for the emission monitoring unit, the present invention is not limited thereto. For example, analog metering type circuits or the like may also be used.

Moreover, in the second embodiment described above, the quantity of overrun light is corrected on each chopper emission. However, the present invention is not limited thereto. For example, the total sum of the quantities of overrun light for the entire split emission may be predicted so that the number of emissions is corrected in accordance with the total sum of the quantities of overrun light.

The invention is not limited to the above embodiments and various modifications may be made without departing from the spirit and scope of the invention. Any improvement may be made in part or all of the components.

What is claimed is:

1. An electronic flash device comprising:

an emission unit for performing a single flash emission;

an emission monitoring unit for monitoring the quantity of emission by said emission unit; and an emission control unit for stopping the single emission by said emission unit based on a comparison between the quantity of emission monitored by said emission monitoring unit and a predetermined target quantity of emission, wherein said emission control unit predicts the quantity of overrun light after the stopping of the single emission based on the target quantity of emission and corrects emission stop timing in accordance with the quantity of overrun light.

2. An electronic flash device according to claim 1, wherein said emission control unit corrects the emission stop timing upon each emission when repeating the emitting/stopping by said emission unit a plurality of times to perform split emission.

3. An electronic flash device according to claim 1, wherein said emission control unit predicts the total sum of the quantities of overrun light for the entire split emission when repeating the emitting/stopping by said emission unit a plurality of times for split emission, and corrects the number of emissions in accordance with the total sum of the quantities of overrun light.

4. An electronic flash device comprising:

an emission unit for performing flash emission;

an emission monitoring unit for monitoring the quantity of emission by said emission unit; and an emission control unit for stopping the emission by said emission unit based on a comparison between the quantity of emission monitored by said emission monitoring unit and a predetermined target quantity of emission, wherein said emission monitoring unit includes:

a photoelectric transducer for receiving light from said emission unit to generate an output according to the intensity of the light received;

a storage unit for storing said output generated by said photoelectric transducer;

a discharge control unit for sequentially discharging a predetermined amount of storage out of said storage unit so that the storage in said storage unit is maintained generally constant; and a counter for counting the number of times said discharge control unit discharges said predetermined amount of storage and outputting the count result as the result of monitoring the quantity of emission, and wherein said emission control unit predicts the quantity of overrun light after stopping of the emission based on the target quantity of emission and corrects emission stop timing in accordance with the quantity of overrun light.

5. An electronic flash device according to claim 4, wherein said emission control unit predicts the quantity of overrun light after stopping of the emission based on the rate between the target quantity of emission and the quantity of full emission by said emission unit (the rate of emission), and corrects emission stop timing in accordance with the quantity of overrun light.

6. An electronic flash device according to claim 4, wherein said emission control unit corrects the emission stop timing upon each emission when repeating the emitting/stopping by said emission unit a plurality of times to perform split emission.

7. An electronic flash device according to claim 4, wherein said emission control unit predicts the total sum of the quantities of overrun light for the entire split emission when repeating the emitting/stopping by said emission unit a plurality of times for split emission, and corrects the number of emissions in accordance with the total sum of the quantities of overrun light.

8. An electronic flash device comprising:

an emission unit for performing a single flash emission;

an emission monitoring unit for monitoring the quantity of emission by said emission unit; and an emission control unit for stopping the single emission by said emission unit based on a comparison between the quantity of emission monitored by said emission monitoring unit and a predetermined target quantity of emission, wherein said emission control unit predicts the quantity of overrun light after stopping of the single emission based on the rate between the target quantity of emission and the quantity of full emission by said emission unit (the rate of emission), and corrects emission stop timing in accordance with the quantity of overrun light.

9. An electronic flash device according to claim 8, wherein said emission control unit corrects the emission stop timing upon each emission when repeating the emitting/stopping by said emission unit a plurality of times to perform split emission.

10. An electronic flash device according to claim 8, wherein said emission control unit predicts the total sum of the quantities of overrun light for the entire split emission when repeating the emitting/stopping by said emission unit a plurality of times for split emission, and corrects the number of emissions in accordance with the total sum of the quantities of overrun light.

* * * * *